Aug. 9, 1966    C. A. NEUENDORF ETAL    3,265,334
MAXIMUM PERFORMANCE TAKE-OFF DIRECTOR

Original Filed June 25, 1962    16 Sheets—Sheet 1

INVENTORS
CHARLES A. NEUENDORF
WILLIAM G. MORETTI, JR.
BY Harry A. Herbert Jr
ATTORNEY
James S. Shannon
AGENT INVENTORS
CHARLES A. NEUENDORF
WILLIAM G. MORETTI, JR.
BY Harry A. Herbert Jr
ATTORNEY James S. Shannon
AGENT

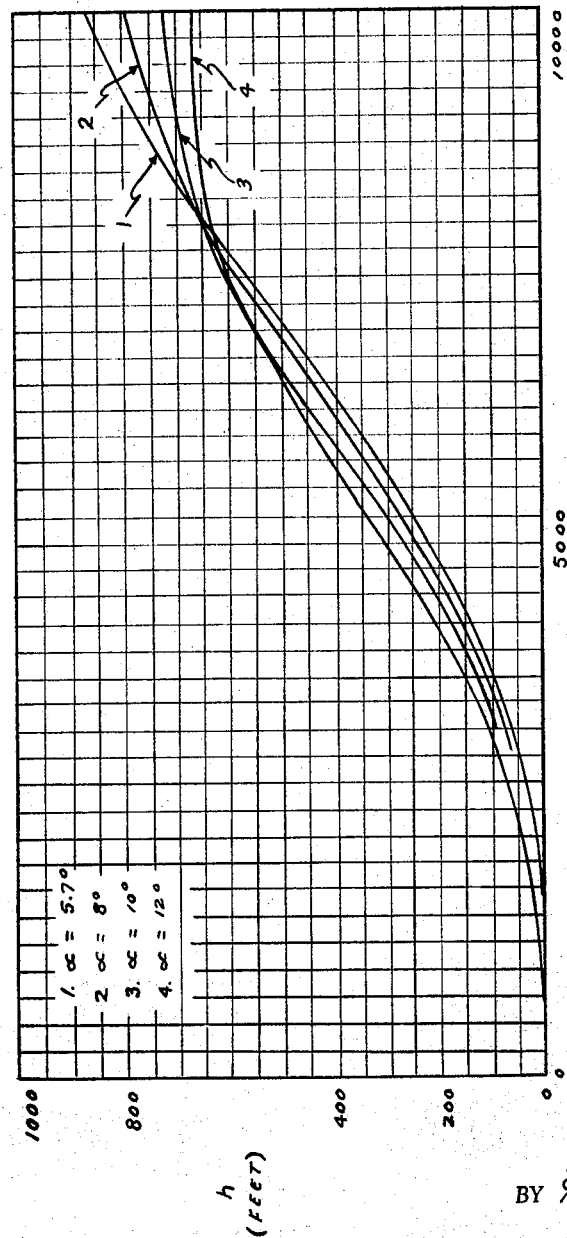

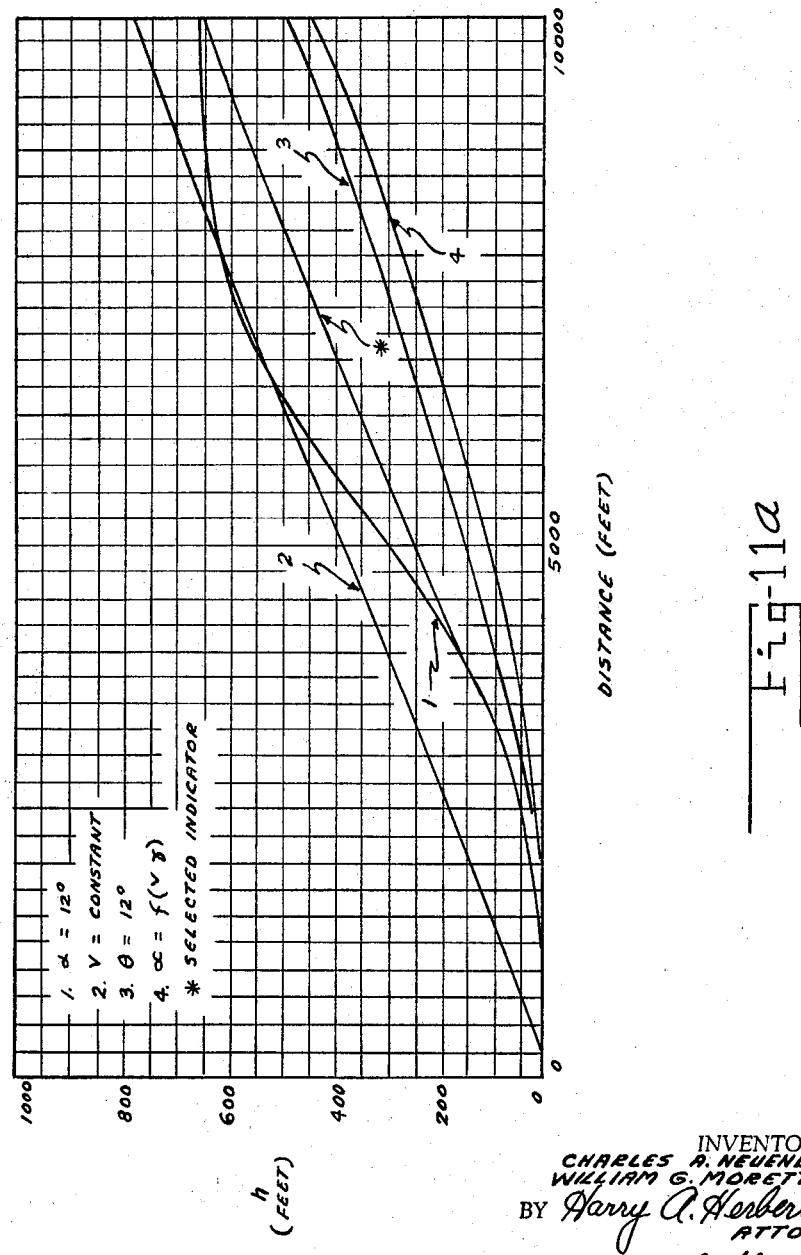

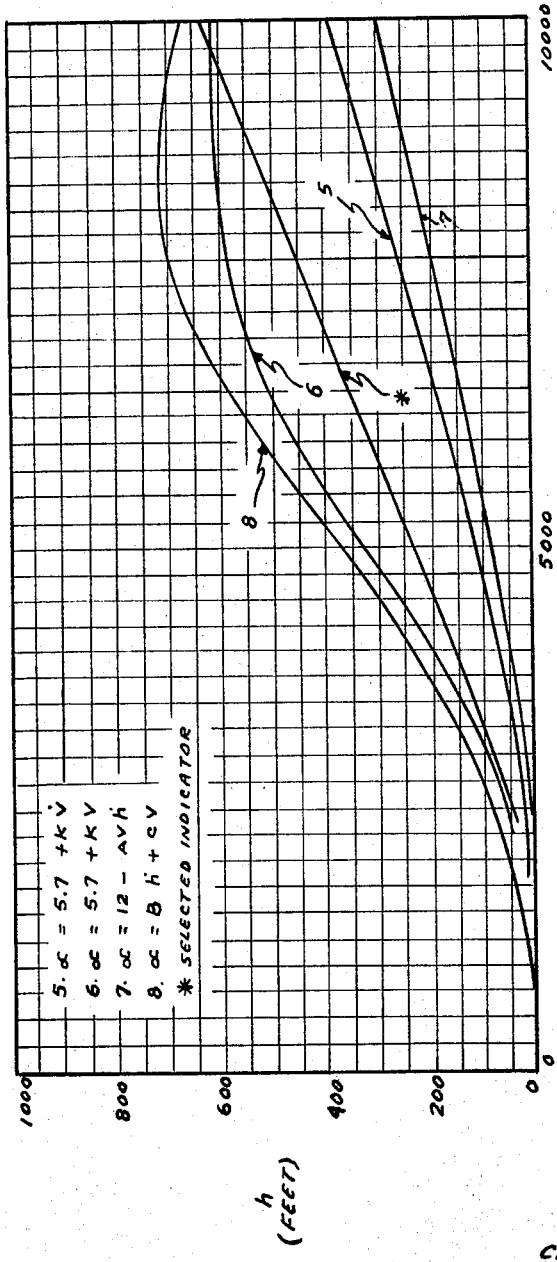

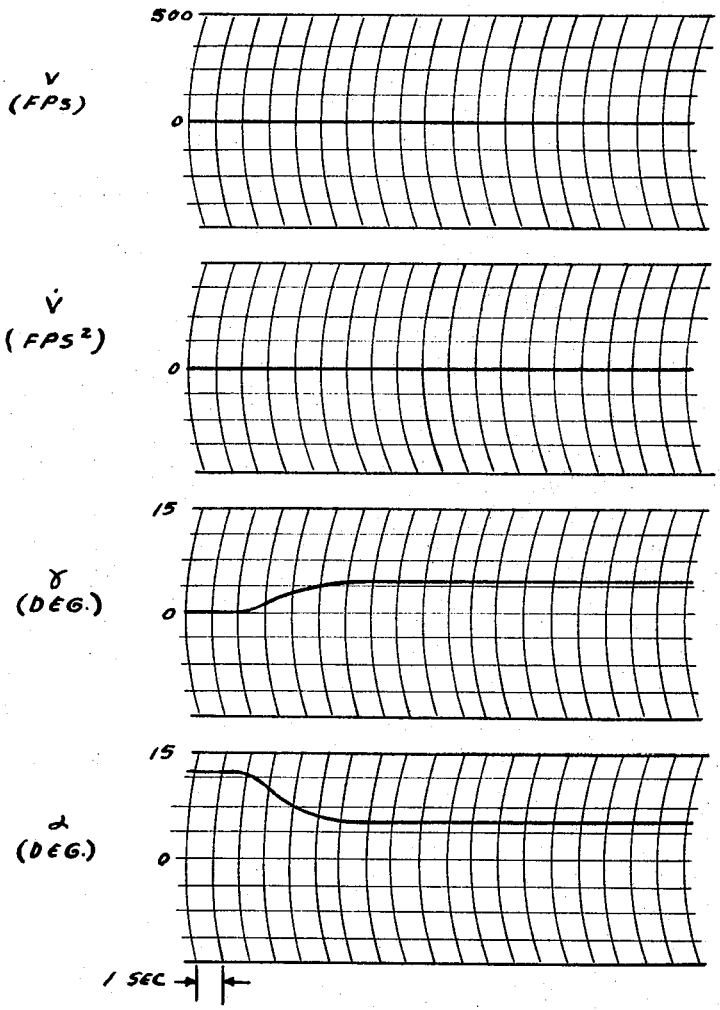

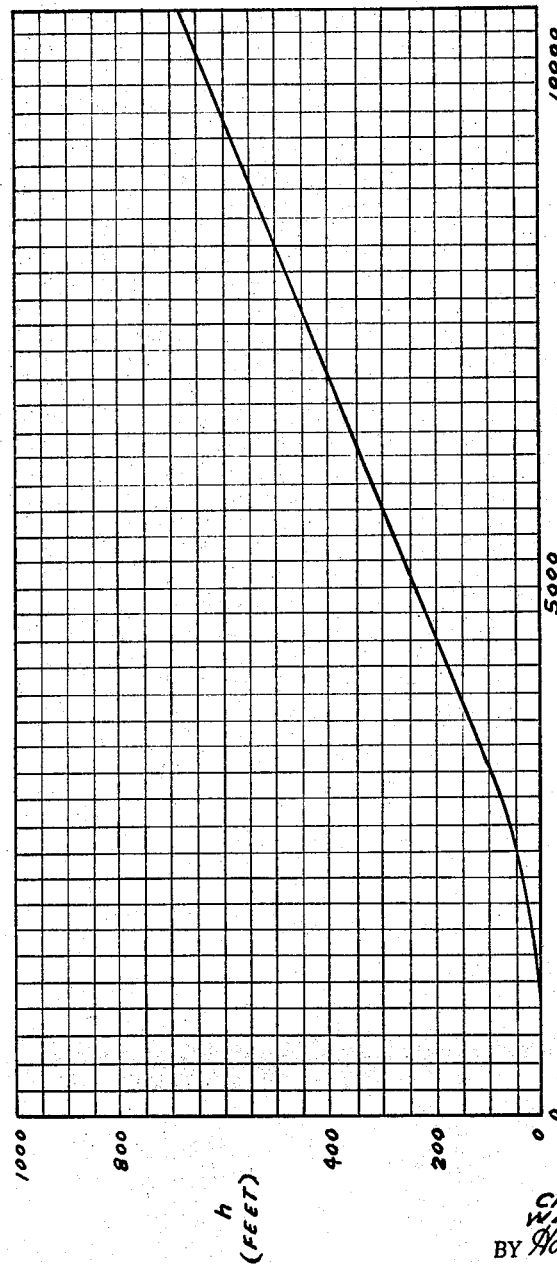

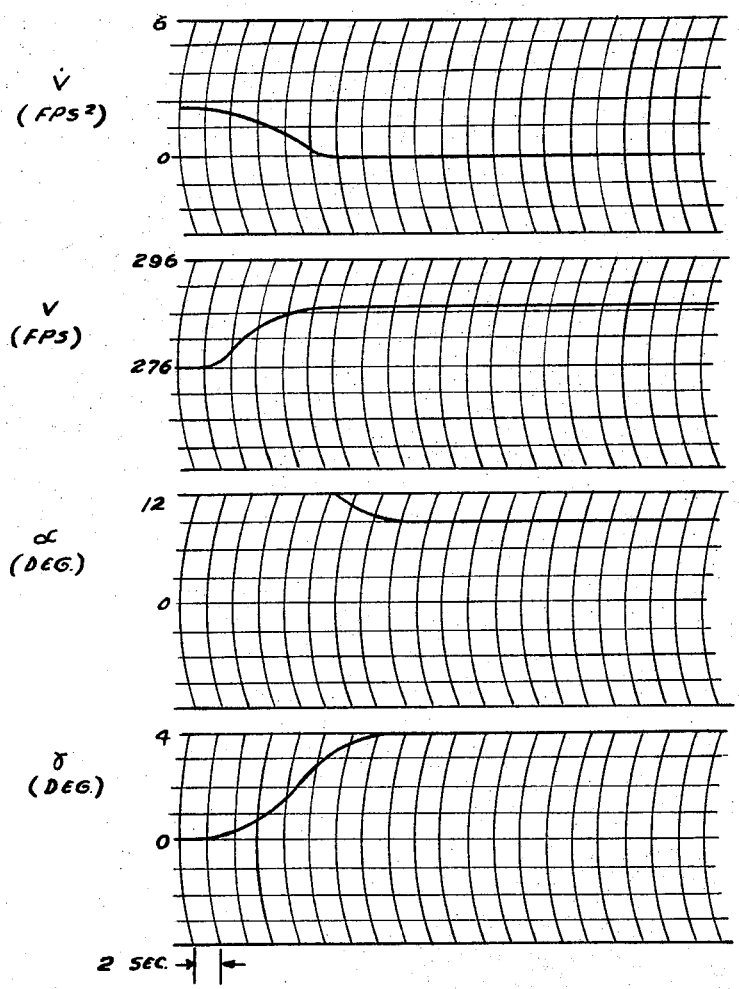

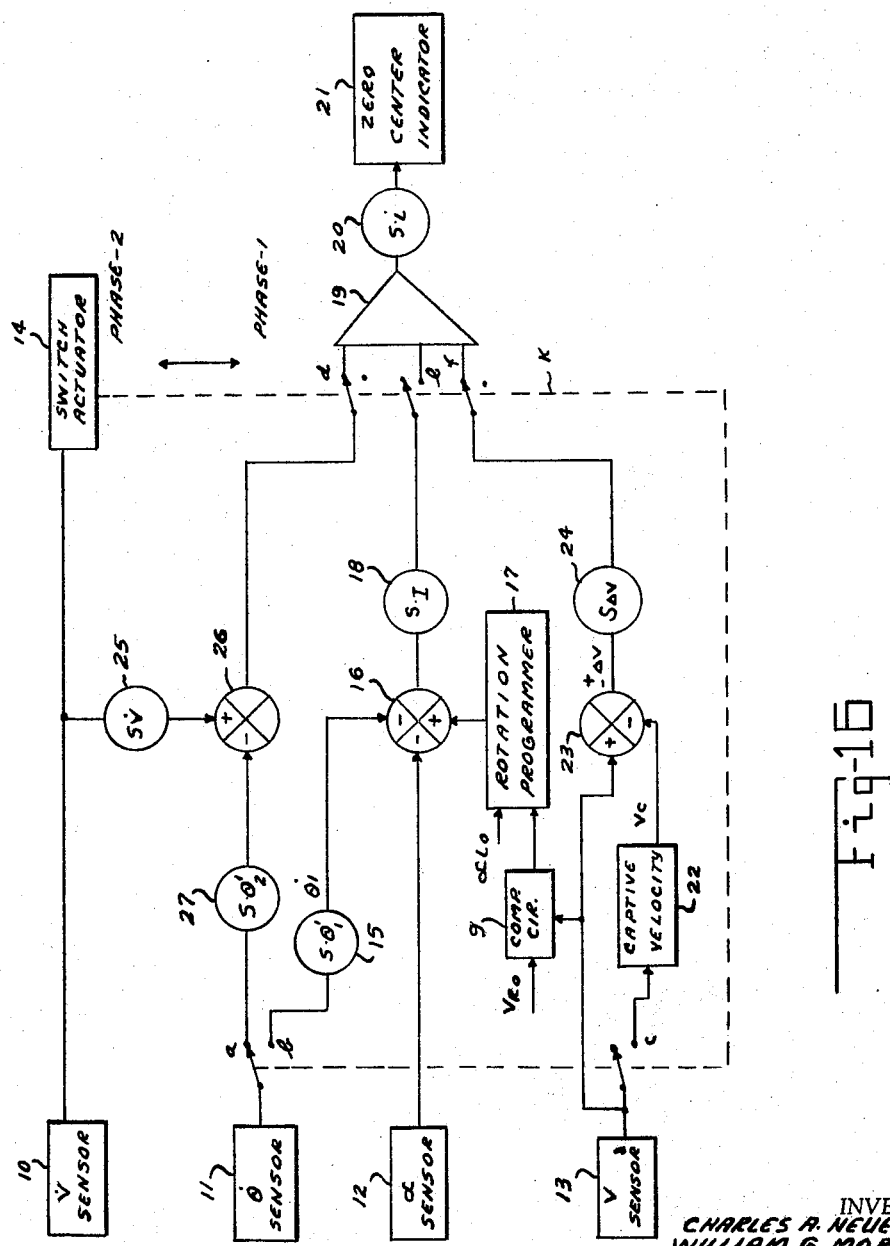

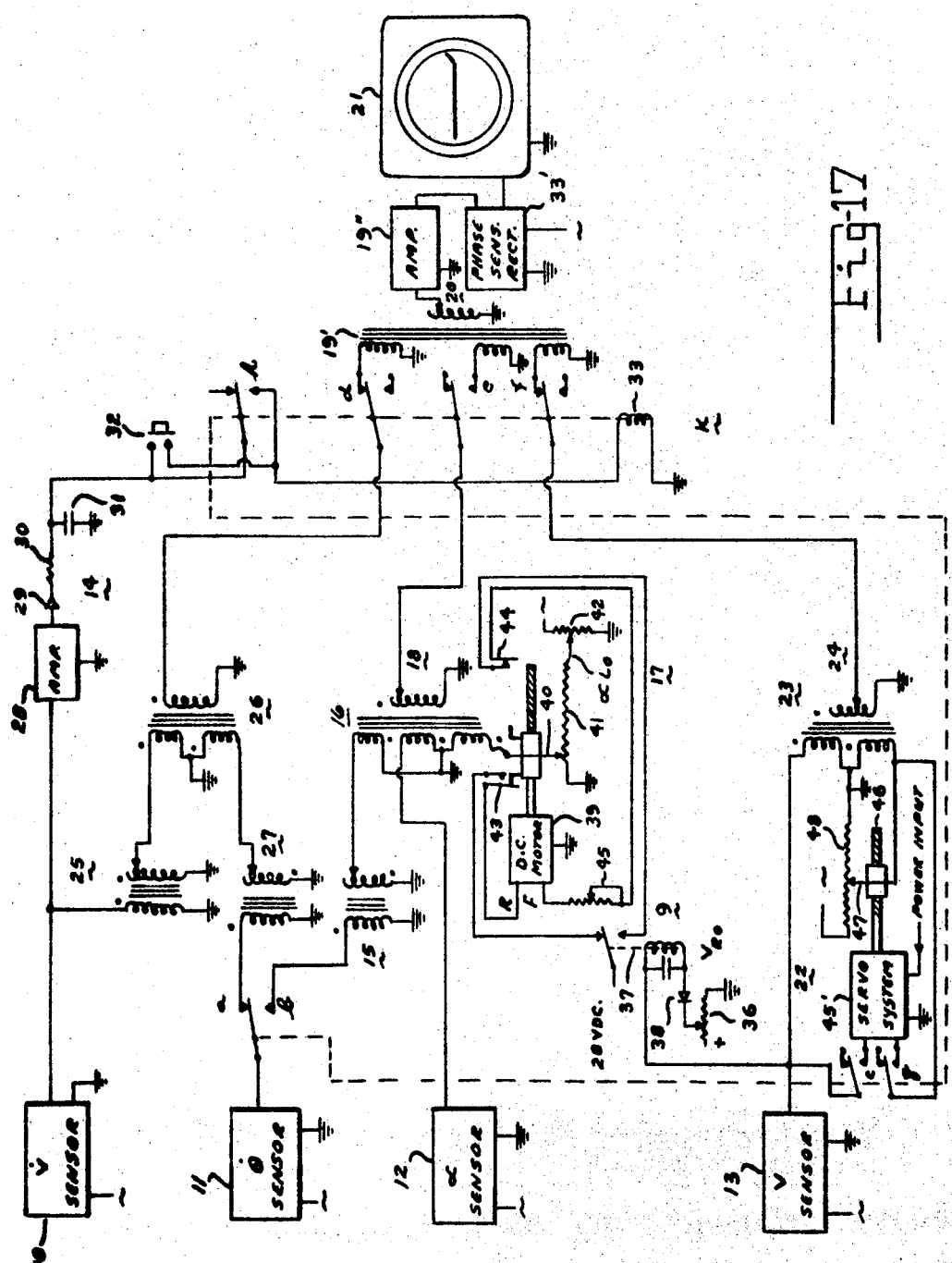

United States Patent Office 3,265,334
Patented August 9, 1966

3,265,334
MAXIMUM PERFORMANCE TAKE-OFF DIRECTOR
Charles A. Neuendorf, Box 9273, Wright Patterson AFB, Toledo, Ohio, and William G. Moretti, Jr., 17 Princeton Road, Burlington, Mass.
Original application June 25, 1962, Ser. No. 205,135, now Patent No. 3,200,642, dated Aug. 17, 1965. Divided and this application Feb. 24, 1965, Ser. No. 444,479
1 Claim. (Cl. 244—77)

The invention described herein may be manufactured and used by or for the United States Government for governmental purposes without payment to us of any royalty thereon.

This is a division of application Serial No. 205,135, filed June 25, 1962.

The purpose of this invention is to provide a director which will enable a pilot to obtain maximum take-off performance without visual reference to the ground.

Investigations leading to the design of the director established that maximum performance results when the take-off is accomplished in two phases, in the first of which a constant angle of attack is maintained and in the second of which a constant velocity is maintained, and in which the transition from the first phase to the second phase occurs when the acceleration of the aircraft has fallen to zero. Briefly, the director described herein is a device to enable the pilot to control the aircraft in such manner as to take off in accordance with the above-stated program.

Accurate take-off instrumentation is especially important in the case of large heavily-loaded aircraft. In such aircraft, establishing the correct attitude for lift-off is of primary concern. For example, in the KC-135, a lift-off attitude error of only two degrees can either extend the ground roll by 3200 feet or result in take-off flight perilously close to stall conditions, depending upon the direction of the error. This situation makes the use of an attitude gyro, the instrument usually employed to supply pitch information during take-off, undesirable since the indication of this instrument is affected by the acceleration of the aircraft during ground roll, with the result that an erroneous indication of the lift-off attitude may be given. In order to avoid this source of error, the director described herein obtains pitch information from an angle-of-attack sensor which is unaffected by acceleration, the pitch angle and the angle of attack being equal during ground-roll.

The invention will be described in more detail with reference to the accompanying drawings in which.

Figure 10:
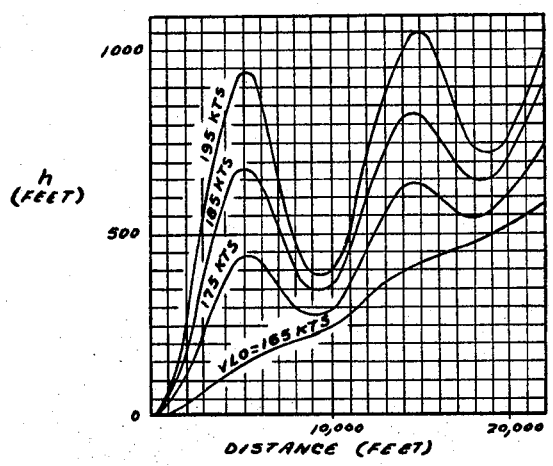
Figure 3:
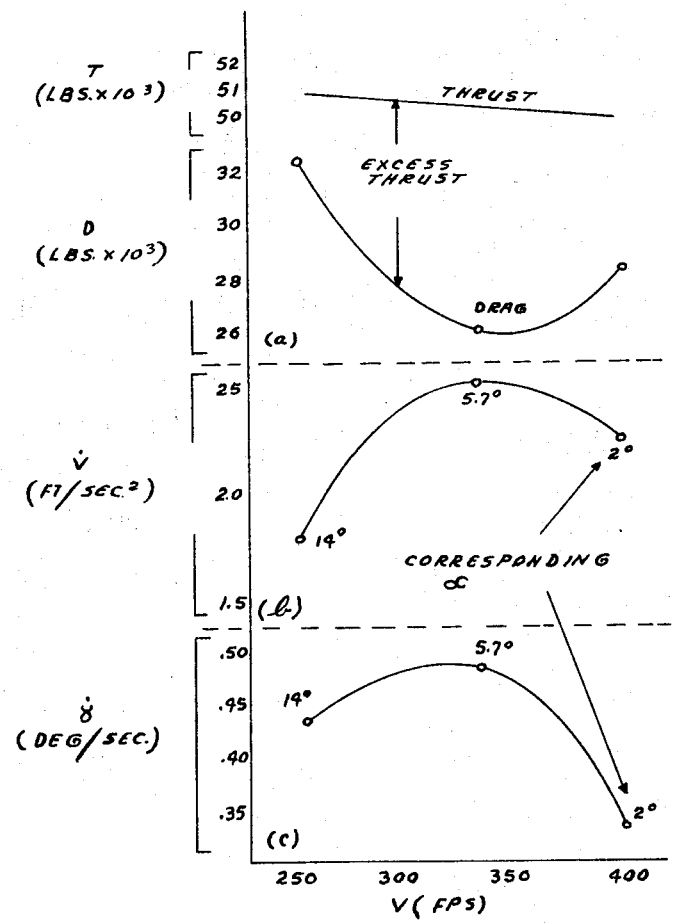
Figure 18:
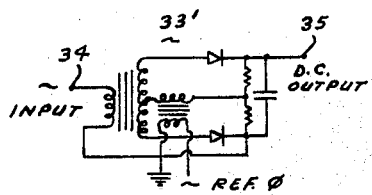
Figure 4:
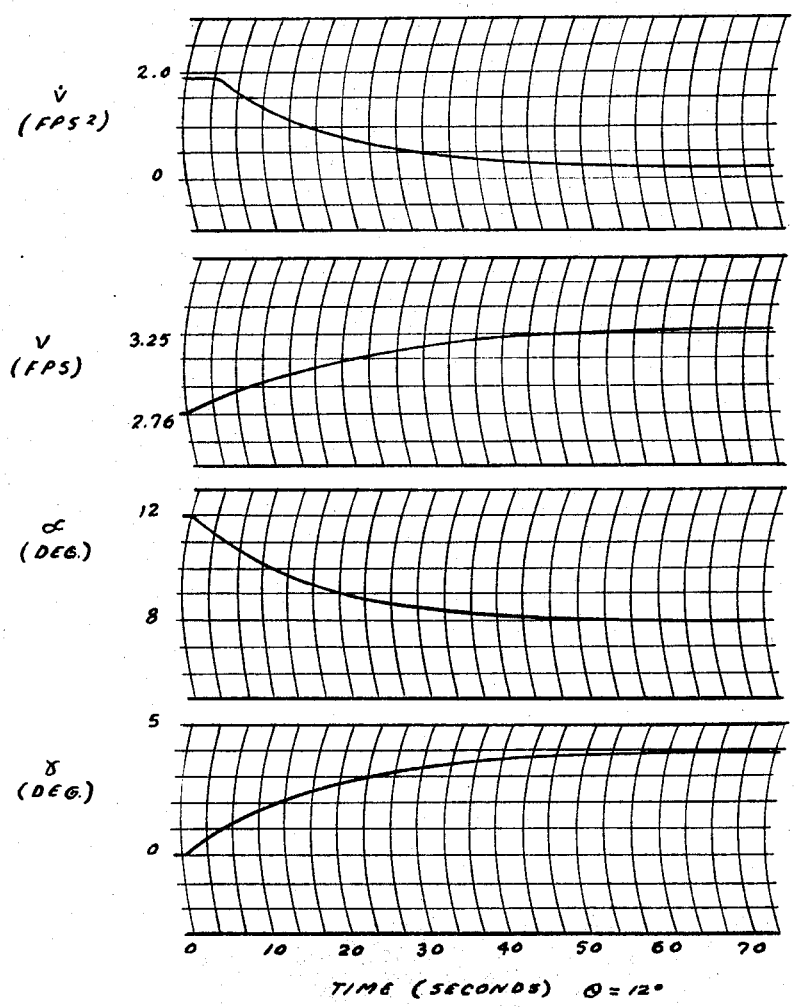
Figure 5:
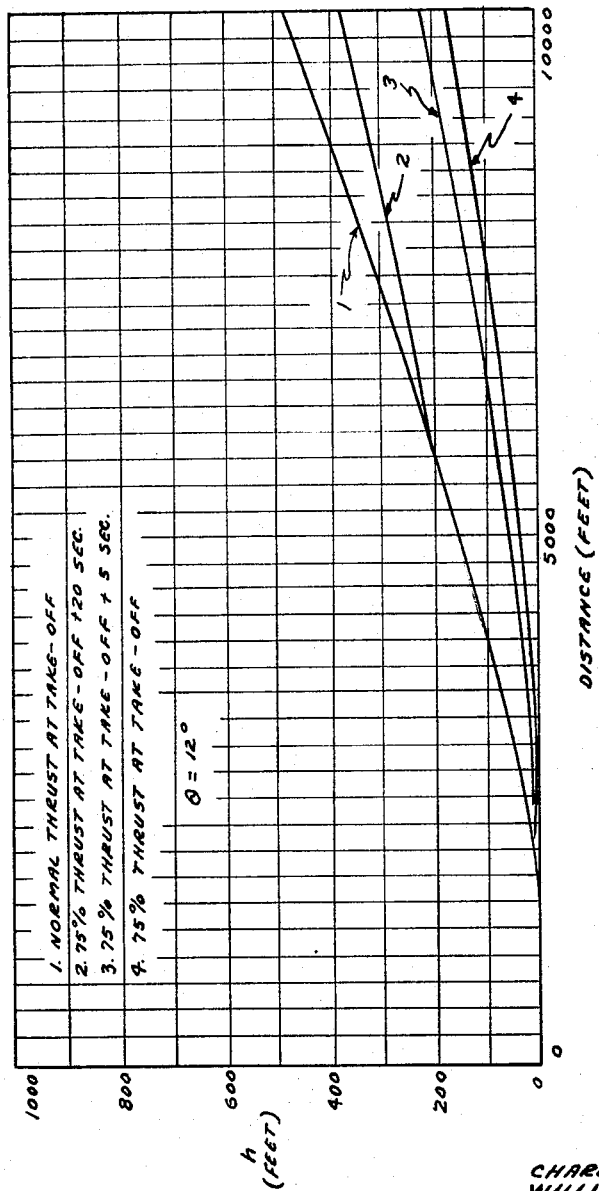
Figure 6:
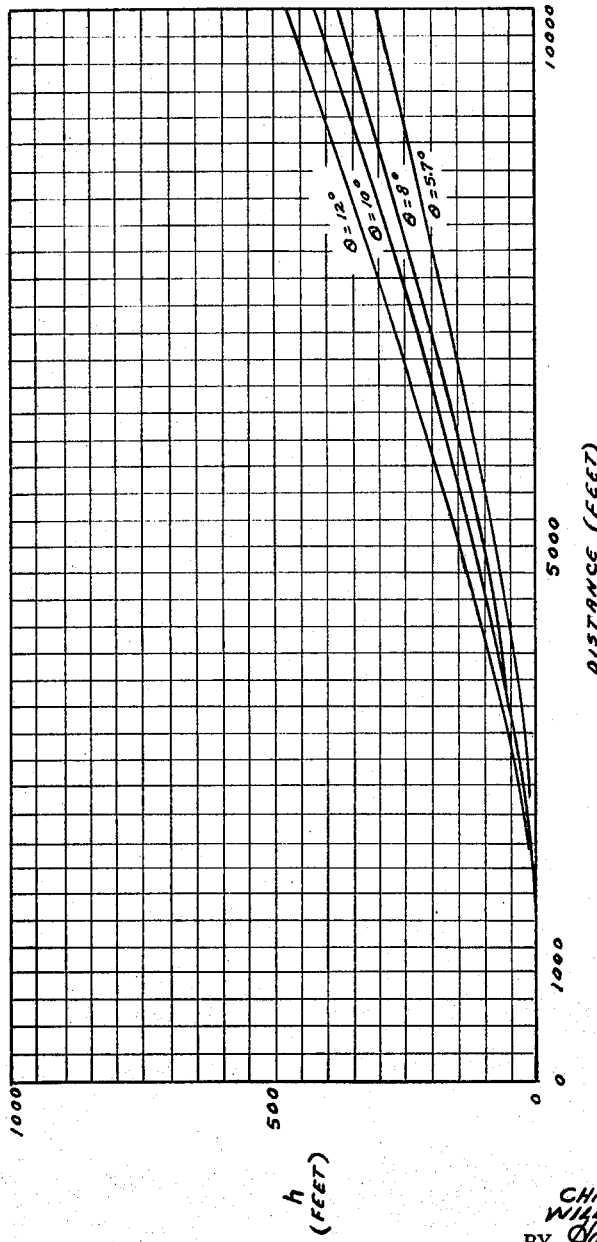
Figure 7:
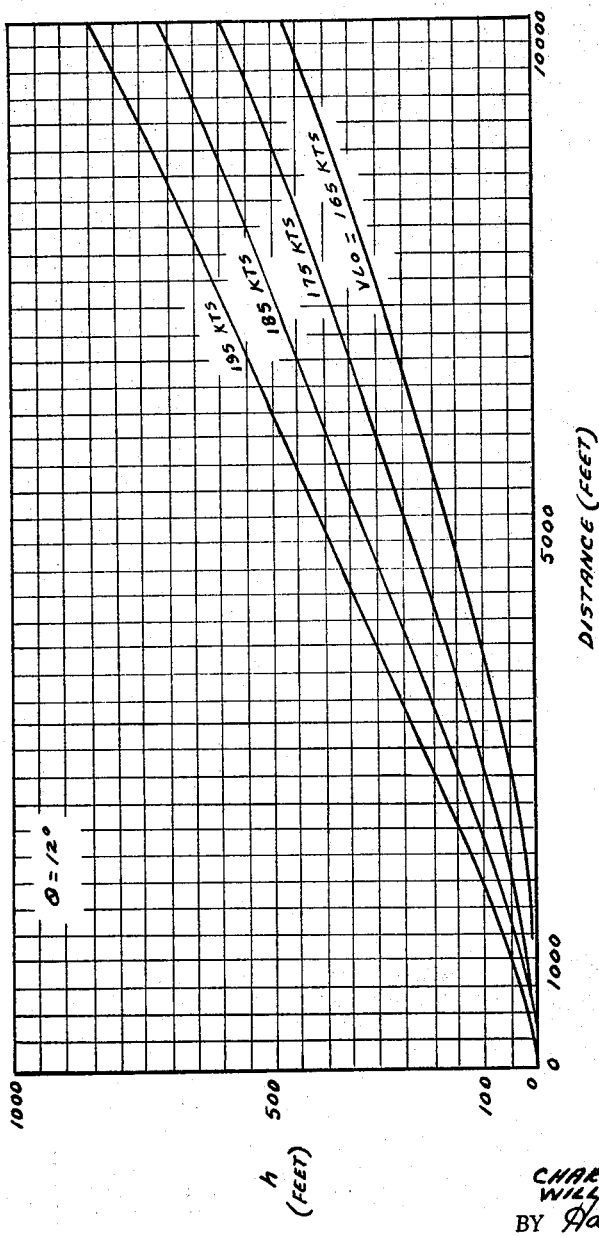
Figure 8:
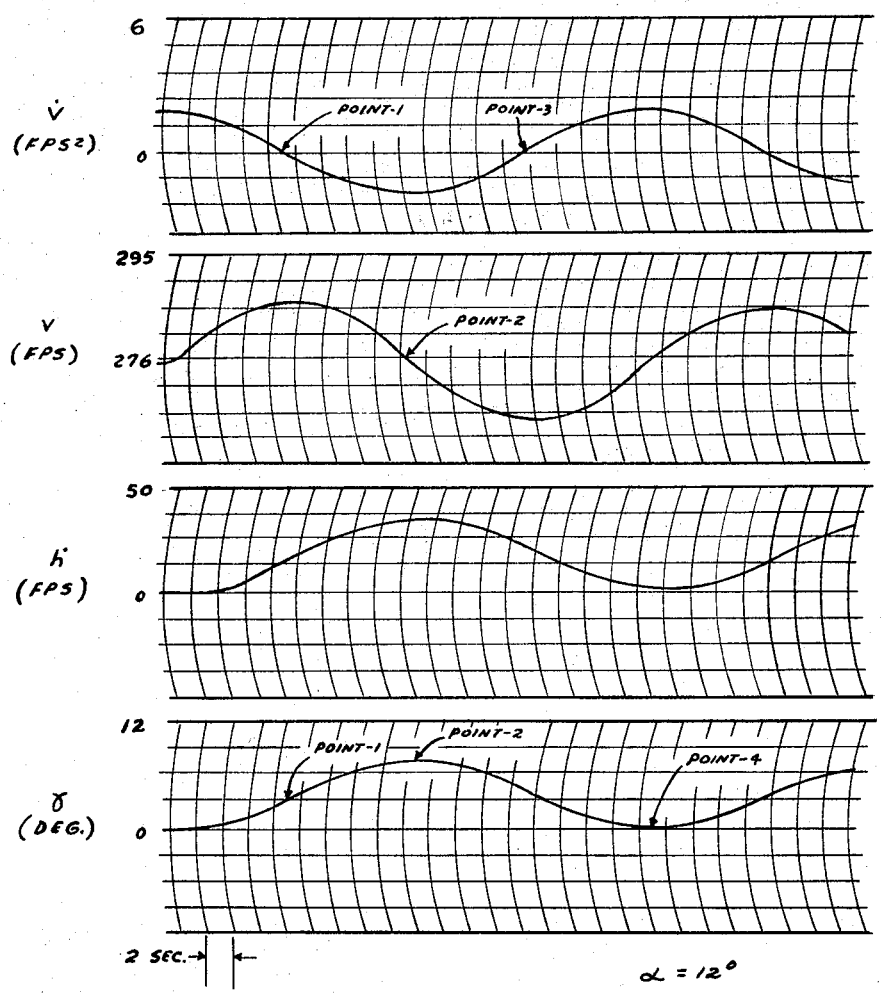
Figure 12:
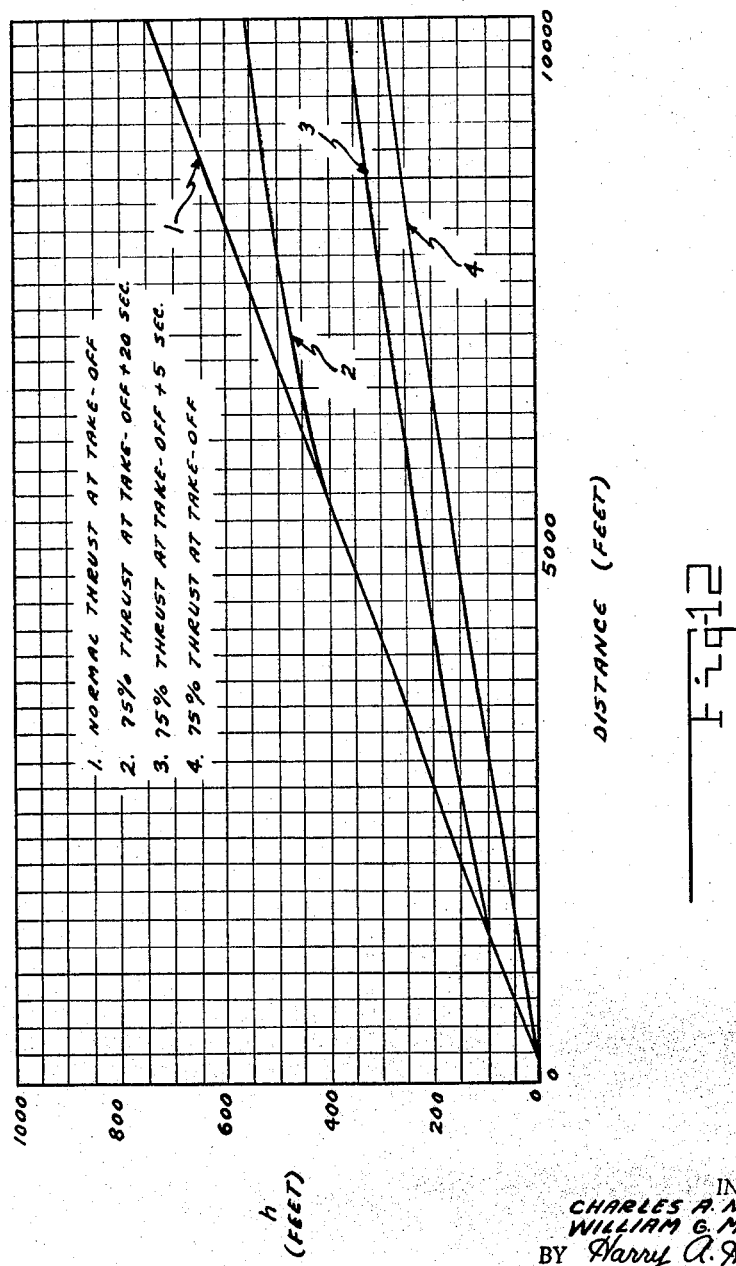

FIG. 3 shows the excess thrust available at various airspeeds for a typical cargo aircraft, FIG. 4 shows time plots of $\dot{V}$, V, $\alpha$ and $\gamma$ for a constant pitch angle tagke-off, FIG. 5 shows altitude vs. distance at reduced thrust for a constant pitch angle take-off, FIG. 6 shows altitude vs. distance for take-offs at constant pitch angles of various values, FIG. 7 shows the effects of various lift-off speeds in constant pitch angle take-offs, FIG. 8 shows time plots of $\dot{V}$, V, $\dot{h}$ and $\gamma$ for a typical take-off with constant angle of attack, FIG. 9 gives plots of altitude vs. distance for take-offs at various constant angles of attack, FIG. 10 shows the effects of various lift-off speeds using a constant angle of attack, FIGS. 11a and 11b show take-off flight paths for various variables in a typical aircraft's equations of motion, FIG. 12 shows altitude vs. distance for constant velocity take-offs under various thrust conditions, FIG. 13 shows time plots of $\dot{V}$, V, $\gamma$ and $\alpha$ for a take-off at constant velocity, FIGS. 14 and 15 show the take-off performance of a typical aircraft controlled by a flight director in accordance with the invention, FIG. 16 is a logical diagram of a flight director in accordance with the invention, FIG. 17 shows a practical embodiment of the system shown in FIG. 16, and FIG. 18 shows a suitable rectifier for use in FIG. 17.

The following symbols are used in the specification:

$\theta$—pitch angle
$\gamma$—flight path angle
$\dot{\gamma}$—rate of change of flight path
$\alpha$—angle of attack
V—velocity
$\dot{V}$—acceleration
D—drag
L—lift
W—weight
T—thrust
m—mass
M—moment
$I_{YY}$—moment of inertia
$V_{LO}$—lift-off velocity
$V_S$—stall velocity
KTS—knots
h—height
$\dot{h}$—rate of climb

FLIGHT MECHANICS

To better follow the various stages leading to the development of the take-off indicator described herein, a review of flight mechanics and the take-off problem is desirable, together with an analysis of the vertical gyro and the angle-of-attack indicator presently used as pitch control indicators.

Flight dynamics

Figure 1:
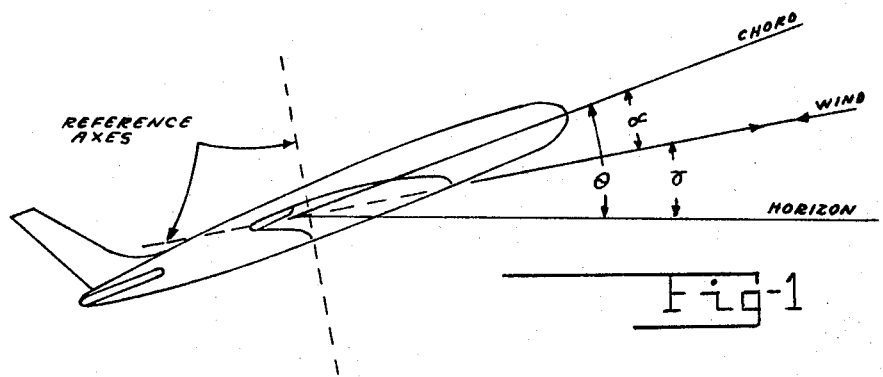
FIG. 1 illustrates the flight path angles of an aircraft.
Figure 2:
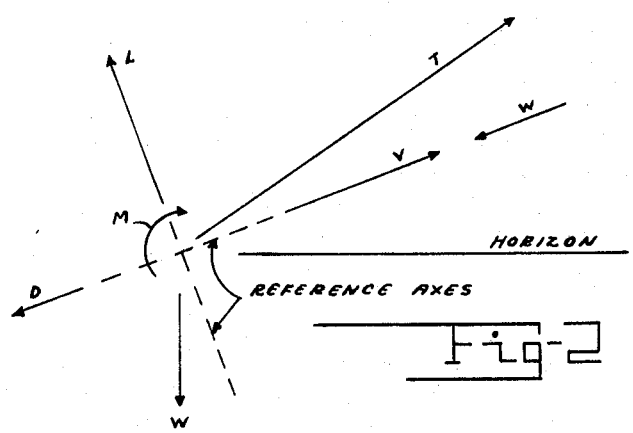
FIG. 2 shows the forces and moments acting on an aircraft.

FIG. 1 shows the flight angles of an aircraft and FIG. 2 the forces and moments acting on an aircraft. In developing the force equations the wind axis reference system is used. In this system, the reference axis is always aligned with the velocity vector of the aircraft, as shown in FIG. 1, where $\theta$, the pitch angle, is defined as the angle between the horizon and the wing chord. As shown, the angle $\gamma$ is the flight path angle measured from the horizon to the wind axis; and the angle of attack $\alpha$ is the angle between the wind axis and the wing chord.

If all forces acting on the aircraft are assumed to act through the aircraft center of gravity, their force vectors will be as shown in FIG. 2. The velocity vector V, shown as a reference, is tangent to the flight path and coincident with the wind axis, and is in the direction of flight of the aircraft; drag D is in the opposite direction. The lift L is perpendicular to the wind axis and the weight W is acting along the true vertical. In this particular diagram, the thrust vector T is assumed to act along the wing chord of the aircraft. The moment acts about the center of gravity.

By summing the forces with reference to the wind axis system and summing the moments about the center of gravity, the following equations are derived:

(1) $\quad T \cos \alpha - D - W \sin \gamma = m\dot{V}$
(2) $\quad L + T \sin \alpha - W \cos \gamma = mV\dot{\gamma}$
(3) $\quad M = I_{YY}\ddot{\theta}$ where M is a complex function primarily of V, $\alpha$, and $\delta_e$ (elevator deflection angle).

From FIG. 2, it can be seen that:

(4) $\quad \theta = \alpha + \gamma$

The moment Equation 3 can be neglected when only the maximum aircraft response is considered, because the inertia term only tends to delay any rotational response. In this preliminary analysis, rotational response time is not a factor. Evaluation is based only on relative response magnitudes and, therefore, the moment equation is neglected. With the remaining equations, it is then possible to represent an aircraft's maximum response characteristics.

Under flight conditions where the drag forces (including W components) are less than the thrust forces, the aircraft will have excess thrust. From Equations 1 and 2, it can be shown that this thrust can be used to produce acceleration either entirely along the flight path, entirely perpendicular to the flight path, or in various combinations between these two extremes. FIG. 3(a) shows the excess thrust available at various airspeeds for a typical cargo aircraft. This excess thrust can then be used to generate the acceleration ($\dot{V}$) values, as shown in FIG. 3(b), or to generate the rate of change of flight path ($\dot{\gamma}$) values shown in FIG. 3(c). Any compromise, therefore, would be between these maximum values. Since utilization of these two parameters is of prime importance during the initial climb phase, further discussion of these parameters will be continued later.

TAKE-OFF ANALYSIS

A complete take-off can be divided into three distinct phases: (1) ground-roll; (2) transition; and (3) initial climb.

The ground-roll phase begins when the aircraft starts the take-off roll and ends when "rotation" speed is obtained. The transition phase begins when the aircraft has sufficient "rotation" speed and ends when the aircraft leaves the ground (lift-off). Initial-climb begins after lift-off and continues until flaps are up.

By rotation it is meant that the aircraft physically rotates about its pitch axis, that is, the nose raises and, as shown in FIG. 1, the angles $\theta$ and $\alpha$ are generated. At this time, the aircraft leaves its three-point attitude and assumes an attitude necessary to break ground at the proper lift-off speed. Normally, the lift-off speed ($V_{LO}$) is 1.2 times the stalling speed of the aircraft ($V_S$). Although take-off is possible at speeds nearer to $V_S$, restrictions such as safety of flight prohibits the use of these speeds. Disturbances, such as gusts or excessive use of controls by the pilot, may cause the airspeed to fall below the stalling speed and level flight will not be maintained. Also, a speed greater than $V_S$ must be maintained in order to curve the flight path as required during the climb-out phase. Another restriction is the physical construction of the aircraft. In the case of the KC–135, the refueling boom will strike the runway at a take-off attitude greater than 12°, which corresponds closely to 1.2$V_S$. Air speeds in excess of 1.2$V_S$ are, of course, allowable but will result in an extended ground roll. For a heavily-loaded aircraft, this ground-roll distance is critical.

Ground-roll phase

The purpose of this phase is to accelerate the aircraft to the lift-off velocity as soon as possible, thus reducing the ground-roll distance. During this phase, only lateral control is necessary and since only longitudinal effects during take-off are analyzed, the ground-roll phase will not be considered.

Transition phase

As the airspeed approaches $V_{LO}$, the aircraft is rotated to the desired lift-off attitude. This attitude depends upon the aircraft and the take-off conditions, but normally an attitude is established which would result in a lift-off velocity of approximately 1.2$V_s$. As rotation begins, the angle $\alpha$ is increased. Since the aircraft is still on the runway, the flight path angle $\gamma$ is zero and $\alpha$ is equal to $\theta$. As $\alpha$ and airspeed increase, the lift and drag also increase. The increase of the drag force, due to an increase of $\alpha$ and airspeed, only tends to reduce the excess thrust which reduces $\dot{V}$. As soon as the lift forces become greater than the gravitational forces, the aircraft will leave the runway and a $\gamma$ will result. At this time, the transition phase ends and the initial climb phase begins.

Initial climb phase

In this phase, the utilization of the excess thrust is of prime importance. As mentioned, this thrust could be used to obtain all $\dot{\gamma}$, all $\dot{V}$, or a compromise between the two. Neither extreme is desirable because an increase of $\dot{V}$ will only increase V and have no effect on $\gamma$ or $\dot{\gamma}$. Thus, no increase in altitude is possible. Likewise, acceleration perpendicular to the flight path will result in a $\dot{\gamma}$ and increase $\gamma$, but no increase of V is possible. Since an increase of V is desired after lift-off, all excess thrust cannot be used to obtain $\dot{\gamma}$. It is also noted that as $\gamma$ increases, the weight component along the flight path increases and reduces the amount of excess thrust available (Equation 1).

Normal take-off

On a typical take-off, the aircraft is accelerated on the runway to the normal rotation speed. As the speed of the aircraft approaches $V_{LO}$ during the ground roll, the pilot starts rotating the aircraft to the desired lift-off attitude. As the angle of attack increases, the lift of the aircraft also increases; until finally, as the break-ground speed is attained and the lift-off attitude is established, the lift component of force becomes greater than the gravitational forces and the aircraft leaves the runway. At lift-off, the angle of attack and the angle $\theta$ are equal and $\gamma$ is zero. The excess thrust is now used to obtain acceleration of both $\dot{V}$ and $\dot{\gamma}$. Since both V and $\gamma$ are increasing while the pilot maintains a constant $\theta$, the angle $\alpha$ decreases. The angle $\theta$ is maintained constant until $V_{LO}$ + 20 knots is obtained. At this time, the excess thrust is no longer needed to accelerate along the flight path, and $\dot{V}$ is made zero. All the excess thrust is then used to obtain acceleration of $\dot{\gamma}$.

The typical initial climb phase, as just explained, appears to be a combination of constant $\theta$ and constant V. This, in effect, is true. However, the use of this type climb is not based on obtaining the maximum performance for which the aircraft is capable, but rather the maximum performance obtainable with present instrumentation. As will be explained later, take-off performance can be improved with different instrumentation. Since the pilot has only the attitude gyro and, in some cases, an angle-of-attack indicator, the take-off characteristics obtained by using each of these indicators independently are of interest and will be analyzed next.

Present pitch control indicators

In this analysis, the vertical gyro and the angle-of-attack indicators were 'flown' on an analog computer through the initial climb phase to determine the advantages and disadvantages of each. This analysis will use the specifications of the KC–135. In preparing for the computer analysis, Equations 1, 3 and 4 were used. The specifications and initial conditions were:

(1) $V_{LO}=276$ f.p.s.
(2) $\alpha_{LO}=12°=\theta_{LO}$
(3) $\gamma_{LO}=0°$
(4) $W=297,000$ lbs.
(5) $T_{LO}=53,000$ lbs.
(6) Flaps set at 30°
(7) Gear down Parameter time plots and aircraft altitude-versus-distance plots were recorded. The time plots show the complete parameter reaction for each indicator. The altitude-versus-distance plots show the distance need to gain 500 feet of altitude. The distance plots also show the flight path obtained with the assumed loss of one engine at various times in the flight.

Constant θ take-off

The attitude gyro, which is installed in most aircraft, is a gyroscopic instrument which should give sensitive, reliable information. However, the instrument has several disadvantages, one being that it is sensitive to acceleration forces. Because of the acceleration present during the ground-roll phase, the attitude gyro can precess as much as 7°. Even the improved attitude gyros precess as much as 2°, which is still too great an error if maximum performance is to be obtained. Besides these objections, the instrument is difficult to read accurately, as small incremental changes are not discernible, and the actual magnitude of θ can only be approximated. However, neglecting these faults, an analog computer analysis and discussion of a constant θ take-off follow. The conditions and techniques of analysis are as stated earlier.

In this type of take-off, the aircraft rotates to some selected pitch angle at $V_{LO}$ and maintains this angle constant from lift-off until completion of the initial climb. Just after rotation, the aircraft will have an angle α equal to θ and the flight path angle will be zero. At this time, the excess thrust produces a positive $\dot{V}$ and V increases. This increase in velocity produces additional lift. This excess will generate some flight path acceleration and, therefore, some γ. Since θ is held constant and γ is increasing, the angle α must decrease. Although α does decrease, the resultant lift continues to increase because V has increased. This trade-off of V and α continues until the excess thrust is balanced by the drag and weight components, and until $\dot{\gamma}$ and $\dot{V}$ are zero.

The effects of the constant θ initial climb are clearly shown on the time plots of FIG. 4. It can be seen that, at lift-off, γ is zero; α is 12°; V is 276 f.p.s.; and $\dot{V}$ is 2 f.p.s.². The flight path angle increases immediately after lift-off, as shown by an increasing γ. Although V increases, the value of $\dot{V}$ is diminishing. As equilibrium is reached, $\dot{V}$ goes to zero; γ remains constant at 4°; α remains constant at 8°; and V remains constant at 325 f.p.s. The altitude vs. distance plots of this phase are shown in FIG. 5 for normal and reduced thrust. FIG. 6 shows the effect of various climb angles, and FIG. 7 shows the effect of rotating the aircraft at various lift-off airspeeds.

Constant α take-off

Although not in widespread use as an attitude control indicator, the angle-of-attack indicator is a means of controlling the pitch of an aircarft. As an instrument, an angle-of-attack indicator has several advantages over the attitude gyro. The instrument is not acceleration sensitive; therefore, no errors are incurred because of ground-roll acceleration. In addition, the indicator can read directly the magnitude of α and the instrument has a satisfactory accuracy of 0.1°. However, one problem does exist: Because the sensor only measures local angle of attack, a position must be found where the relation between local and remote angle of attack is constant, or, in other words, the sensor must be mounted on the aircraft at a location where the wind direction at the sensor with respect to the chord of the aircraft wing, which direction is influenced by the air flow over the aircraft surfaces, has a constant relation to the true wind direction with respect to the chord, over the usable range of the angle of attack. However, this is possible within the limits of instrument accuracy. Therefore, under the assumption that the use of an α indicator is entirely feasible, the explanation of the constant α initial climb phase follows.

In this take-off, the aircraft rotates to a selected angle of attack at $V_{LO}$ and maintains this α throughout the initial climb. As in the constant θ take-off, the excess thrust is producing a positive $\dot{V}$ at lift-off. Since α is held constant, and at $V_{LO}$ the lift is equal to weight, any increase in V will cause the lift to become greater than the weight, resulting in a positive $\dot{\gamma}$. The increase in γ further reduces the excess thrust available which, in turn, reduces $\dot{V}$. Eventually, due to the increasing γ, the excess thrust producing $\dot{V}$ is exhausted. However, a positive $\dot{\gamma}$ is still generated. This is seen as point 1 in FIG. 8 on the computer time plots. The increase in γ after $\dot{V}$ has gone to zero results in an increase in drag components, which further decreases velocity. This decrease in V reduces the lift which, in turn, decreases $\dot{\gamma}$. At point 2 on FIG. 8, the V and, consequently, the lift have been reduced to such an extent as to cause $\dot{\gamma}$ to become zero. Since γ is still at its peak, the velocity continues to decrease and $\dot{\gamma}$ becomes negative and γ decreases. $\dot{V}$, although negative, is building up until at point 3 of FIG. 8 it becomes positive. As V starts to increase, the lift increases which results in $\dot{\gamma}$ increasing until at point 4, $\dot{\gamma}$ equals zero, V is maximum, and the cycle repeats, thus generating the phugoid path. It can be seen also that the condition which generates this phugoid is the phase relation between $\dot{\gamma}$ and $\dot{V}$. It is noted in FIG. 9 that the phugoid is steeper when α is increased, and it is further aggravated when the velocity is increased as shown in FIG. 10. Certainly, any take-off under these conditions is completely unsatisfactory. However, by comparing the initial climb plot with the constant θ plot, it was seen that the initial performance of the constant α climb is better. Because of this, the angle-of-attack indicator as a pitch control device during the initial climb phase has an advantage.

INDICATOR DESIGN AND PERFORMANCE

In the previous section on flight mechanics, it was shown that numerous flight parameters were available to indicate the take-off performance of an aircraft. In this section, the feasibility of combining these parameters as inputs to an indicator, which can be used by the pilot to guide the aircraft during the take-off phase, is explored.

To assist in the design and evaluation of the various indicators, each indicator was evaluated on the analog computer. From the computer, altitude-versus-distance and parameter-versus-time plots were recorded under conditions of normal and reduced thrust for each indicator. The combination safely producing the maximum altitude in the shortest distance under all thrust conditions was selected for further analysis.

Preliminary considerations

Prior to the development of the indicator, several conditions and limitations of the analysis were determined. The ground-roll phase of take-off was not included, because in this phase only lateral control by the pilot is necessary. However, to minimize the ground roll and initiate lift-off as soon as possible, the aircraft is rotated to the maximum allowable angle of attack just as the lift-off velocity is attained. For the KC-135 aircraft, $\alpha_{LO}=12°$ and $V_{LO}=276$ f.p.s. This airspeed and angle of attack constitute the initial condition for all indicator evaluations.

Since the critical period of take-off was established to be between lift-off and 500 feet, the indicator evaluation was not considered beyond this altitude (initial climb phase). During this period, the aircraft was considered to have had gear down and 30° flaps. In order to simulate the loss of one engine, thrust was reduced 25% at various times during take-off. It was reduced at lift-off, lift-off plus 5 seconds, and lift-off plus 20 seconds. As stated earlier, asymmetric forces were neglected for these power-loss simulations. The results of all runs were compared for each indicator combination.

*Parameter selection*

Although numerous flight parameters can be obtained with the computer, some of these parameters cannot be obtained in flight. Sensors which have the degree of accuracy, sensitivity, and necessary dynamics are not readily available. Consequently, an instrument using these parameters would not be realistic. However, it was determined that $\alpha$, $V$, $\dot{V}$, $\theta$, $h$, and $\dot{h}$ could be obtained satisfactorily.

From the aircraft equations of motion, it was seen that $\dot{\alpha}$, $\gamma$, and/or $V$ could be used to control the aircraft. However, in the indicator design, only $\alpha$ and $V$ were used because of their sensor availability, faster response, and direct relationship to present control systems. Therefore, in the design of the instrument, the aircraft's attitude was determined on the analog computer by controlling $\alpha$ and/or $V$ in the equations of motion.

*Indicator selection*

The approaches leading to the indicator development were varied. A complete analytical approach was limited because of the many parameters and their non-linear nature. Besides the analytical approach, three other approaches were used. These were:

(1) An acceleration-modified approach; (2) a velocity-modified approach; and (3) a pilot technique approach.

In each of these approaches, a controlling function determined one of the variables in the aircraft's equations of motion Equations 1 and 2. These controlling functions were:

(1) $\alpha = 12°$
(2) $V = $ Constant
(3) $\theta = 12°$
(4) $\alpha = f(V, \gamma)$
(5) $\alpha = 5.7° + K\dot{V}$
(6) $\alpha = 5.7° + KV$
(7) $\alpha = 12° - AV\dot{h}$
(8) $\alpha = B\dot{h} + CV$ Each of these controlling functions was incorporated in an indicator which was then analyzed on the analog computer. The performance of each indicator was then compared against the design standards previously mentioned. The results are shown in FIGS. 11a and 11b. It was decided that no single controlling function furnished satisfactory results throughout the initial climb. However, by combining the constant $\alpha$ and the constant velocity controlling functions into one indicator, a maximum take-off performance could be obtained. The following relates to this selected indicator.

*Constant angle of attack*

By referring to the altitude-versus-distance plot in FIG. 11b and the time plots in FIG. 8, it can be seen that a constant $\alpha$ climb produces maximum performance until $\dot{V}$ goes to zero. After this, $\dot{\gamma}$ remains positive only at the expense of $\dot{V}$. A continuation of constant $\alpha$ results in the phugoid, as explained in the previous section. However, if a constant $\alpha$ take-off is maintained until $\dot{V}$ goes to zero, then this portion of the climb phase will be maximized.

*Constant velocity*

From Equations 1 and 2, it can be seen that a maximum climb angle is obtained if all excess thrust is used to produce $\dot{\gamma}$. This means that, with $\dot{V}$ at zero, any excess thrust must necessarily be used to obtain a positive $\dot{\gamma}$. Since the constant $\alpha$ portion of the take-off ends with $\dot{V}$ at zero, maximum performance should continue to be obtained if $\dot{V}$ is kept at zero. This flight condition, however, can not be allowed at lift-off. At lift-off, the lift and weight components are equal. If $V_{LO}$ is to remain constant, a sharp increase in the angle of attack would have to be made in order to keep $V_{LO}$ constant, to increase the lift, to generate a positive $\dot{\gamma}$, and to start climbing. Even neglecting the possibility of the aircraft dragging its tail, as would happen with a KC-135, this situation would also lead to a difficult control problem for the pilot, since $V_{LO}$ is much too slow for the initial climb. Another disadvantage of holding $V_{LO}$ constant is that the airspeed indicator is unreliable close to the ground. The actual airspeed may be quite different from an indicated airspeed because of erratic static pressure due to airflow and ground effects. These disadvantages eliminate a constant velocity path without a transition phase. However, if these faults are neglected, the results of using a constant $V$ are shown in FIGS. 12 and 13.

Therefore, by using constant $\alpha$ to transition from $V_{LO}$ to the climb velocity and to gain an initial altitude, a safe, controllable climb speed can be established. The results of a constant $\alpha$—constant $V$ climb are shown in FIGS. 14 and 15 on the parameter time plots and altitude-versus-distance plots. A comparison with the other climbs clearly shows the advantages of using the selector indicator.

A take-off indicator to direct the take-off of an aircraft in accordance with the above constant $\alpha$—constant $V$ program is shown in logical form in FIG. 16. A practical embodiment is shown in FIG. 17. The take-off is accomplished in two phases. The first phase begins with the ground roll, includes lift-off and ends when the aircraft acceleration has fallen to zero. The second phase begins when the first phase ends and extends to the conclusion of the take-off, usually considered to be when the aircraft has attained an altitude of 500 feet.

Referring to FIG. 16, there are four inputs to the take-off indicator, namely, the acceleration ($\dot{V}$) input obtained from acceleration sensor 10, the rate-of-change of pitch ($\dot{\theta}$) input obtained from pitch angle sensor 11, the angle of attack ($\alpha$) input obtained from angle-of-attack sensor 12 and the velocity ($V$) input obtained from air-speed sensor 13. All of these sensors are standard items presently available.

The phase in which the indicator is operating and the transition from phase 1 to phase 2 are controlled by the $\dot{V}$ sensor output. For this purpose the output of this sensor is applied to switch actuator 14 which operates the ganged contacts of switch K downward, as seen in the drawing, in the presence of a $\dot{V}$ output and operates the contacts upward when $\dot{V} = 0$. When the aircraft is rolling down the runway, prior to its rotation to take-off attitude, its velocity is increasing and the resulting output from the $\dot{V}$ sensor 10 causes the switch actuator 14 to operate the switch K to its phase 1 position. During this period there is no change from the horizontal attitude of the aircraft and, consequently, $\alpha$ and $\theta$ are both zero. In phase 1, the output of the $\theta$ sensor is applied through contact $K_b$ and level adjusting device 15 to summing network 16 along with the outputs from the $\alpha$ sensor 12 and the rotation programmer 17. The device 15 is a means for either decreasing or increasing the magnitude of the sensor output as required by the characteristics of the particular aircraft. The $\theta_1$ and $\alpha$ outputs are applied to summing device 16 in aiding relationship and in opposition to the rotation programmer output as indicated by the signs.

The programmer 17 has the proper lift-off attitude $\alpha_{LO}$ of the particular aircraft set into it in advance. Its operation is initiated when the aircraft on the runway has reached the proper rotation velocity $V_{RO}$. This is accomplished by comparing in circuit 9 the aircraft velocity V from sensor 13 with the velocity $V_{RO}$ previously set into the device and representing the velocity at which rotation of the aircraft from the horizontal to the proper lift-off attitude should begin. When V exceeds $V_{RO}$ the output from programmer 17 increases linearly from zero to a value equal to $\alpha_{LO}$, the lift-off attitude, over a predetermined interval of time such, for example, as 1 to 5 seconds depending upon the particular aircraft.

Since $\alpha$, $\theta_1$ and the output of programmer 17 are all zero up until the time that $V=V_{RO}$, there is no output from network 16 to level adjusting device 18. When V becomes equal to $V_{RO}$ the output from programmer 17 starts to increase from zero toward $\alpha_{LO}$. This produces an output from network 16 which is applied through element 18, contact $K_e$, summing amplifier 19 and level adjusting device 20 to zero center indicator 21. This causes the indicator to leave its center position and indicate a nose-low condition to the pilot. In response to this the pilot raises the nose of the aircraft thus generating an $\alpha$ output from sensor 12 which opposes the output from programmer 17 and returns the indicator 21 to its zero position. At the same time a $\theta_1$ output is produced, due to the increase in pitch angle of the aircraft, which aids the $\alpha$ output in returning the indicator to zero. The $\theta_1$ output therefore provides an anticipating factor in the system and prevents overcontrol by the pilot. By raising the nose of the aircraft as required to maintain a zero indication on indicator 21, the pilot rotates the aircraft while still on the runway from its horizontal position, where $\theta=\alpha=0$, to the lift-off attitude $\alpha_{LO}$ during the short interval established by the programmer 17.

After lift-off the pilot holds the indicator at zero, by means of the pitch control of the aircraft, thus maintaining a constant angle of attack equal to $\alpha_{LO}$. Any deviation from this angle results in a deviation of the indicator from its zero position, the direction of the indicator deviation indicating to the pilot the direction of the pitch angle correction necessary to return $\alpha$ to equality with $\alpha_{LO}$.

After lift-off the acceleration $\dot{V}$ decreases as the aircraft climbs. When $\dot{V}$ reaches zero, switch actuator 14 moves switch K to its phase 2 position, thus ending phase 1 of the take-off operation. During phase 1 the V output of sensor 13 was continuously applied through contact $K_c$ to a memory device 22. At the transition from phase 1 to phase 2 contacts $K_c$ open and the velocity of the aircraft when the transition occurred is held captive by device 22. During phase 2 this captive velocity is compared with the actual velocity in summing network 23 and their difference $\pm \Delta V$ is applied through level adjusting device 24 and contact $K_f$ to an output of summing amplifier 19 and thence through level adjusting device 20 to indicator 21.

In phase 2, the indicator 21 signals to the pilot the pitch correction necessary to hold V in equality with $V_c$. When $V=V_c$, $\Delta V=0$ and indicator 21 is in its zero position. If V exceeds $V_c$, $\Delta V$ is positive and proportional to the velocity difference. This causes indicator 21 to deviate from zero in the direction indicating the nose of the aircraft to be too low. Also, the acceleration that produced the greater velocity (the acceleration was zero at the end of phase 1) causes a $\dot{V}$ output from sensor 10 which is fed through level adjusting device 25, summing network 26 and contacts $K_d$ to the indicator 21. This output is of the same sign as that from network 16 and aids the latter in producing a nose-low indication. In response, the pilot raises the nose to increase the rate of climb. This results in a decreasing velocity so that $\dot{V}$ changes sign and $\Delta V$ decreases. Also, a $\theta$ output is generated which is applied through contact $K_a$ and level adjusting device 27 to summing network 26. The declining $\Delta V$ causes the indicator to move toward zero and this effect is aided by the $-\theta_2$ and the $-\dot{V}$ which are combined in the output of network 26 and oppose the effect of the $+\Delta V$. Thus $\theta_2$ and $\dot{V}$ have a compensating or anticipatory effect which reduces the possibility of overcontrol by the pilot. If V becomes less than $V_c$, a $-\Delta V$ and a $-\dot{V}$ are generated which cause the indicator to deviate from zero in the direction signaling a nose-high condition. In response the pilot reduces the pitch angle which increases the velocity by decreasing the rate of climb and generates the compensating factors $+\dot{V}$ and $+\theta_2$. Therefore, by keeping the indicator zeroed, the aircraft velocity is kept constant at $V_c$ during phase 2. This phase of the take-off operation are considered at an end when the aircraft has reached an altitude of 500 feet.

FIG. 17 illustrates a practical embodiment of the take-off director shown in logical form in FIG. 16. The same reference numerals are used to identify corresponding components in the two figures. The system in FIG. 17 employs alternating current circuits. Thus, the output of each of sensors 10, 11, 12 and 13 is an alternating voltage having an amplitude proportional to the magnitude of the quantity sensed and one of two opposite phases depending upon the sign of the quantity sensed.

The switch actuator comprises amplifier 28, rectifier 29, a filter comprising resistor 30 and condenser 31, and a normally open push-button switch 32. Switch K consists of a relay having coil 33 and contacts a–h. As soon as the aircraft starts its ground-roll the acceleration produces an output from sensor 10 which is amplified, rectified and filtered by elements 28, 29, 30 and 31 to produce a direct voltage across capacitor 31. The sensitivity of the switch actuator is high enough, due to amplifier 28, that any significant output from sensor $\dot{V}$ produces sufficient voltage across capacitor 31 to actuate relay K. Therefore, shortly after the ground-roll has commenced, the take-off director may be placed in phase 1 by a momentary closure of pushbutton switch 32. This actuates relay K which holds through contact $K_h$ for as long as there is a significant output from sensor 10. When V has fallen to zero at the end of phase 1, relay K is released and contacts $K_h$ open. This isolates coil 33 from capacitor 31 and prevents its energization by a $\dot{V}$ output during phase 2.

The level adjusting devices 15, 25 and 27 are in the form of transformers having adjustable secondary taps. Summing devices 16, 23 and 26 are in the form of transformers having a single secondary and as many primaries as there are inputs. The functions of level adjusting devices 18, 20 and 24 are accomplished by the adjustable taps on the secondaries of summing transformers 16, 19' and 23. The settings of the level adjusting devices are determined by the characteristics of the aircraft with which the director is to be used. For a director designed for a particular aircraft, separate level adjusting devices are not necessary since the required sensitivities may be designed into the associated summing transformers by proper choice of the number of turns in the windings.

The function of the summing amplifier 19 in FIG. 16 is performed by summing transformer 19' and alternating current amplifier 19" in FIG. 17.

Zero center indicator 21 in FIG. 17 is of a direct current type having a horizontal bar that moves up or down relative to the center or zero of the instrument in proportion to the magnitude of the direct current input and in the direction determined by the polarity of the input. It is therefore necessary to convert the alternating current output of amplifier 19" to direct current for operating the indicator and, for this purpose, phase sensitive rectifier 33' is provided. The output of amplifier 19" has an amplitude proportional to the error in attitude or velocity and one of two opposite phases depending upon the direction of the error. This must be converted to a direct voltage proportional to the amplitude of the A.C. output with polarity corresponding to the phase of the A.C. output. A suitable circuit for rectifier 33' is shown in FIG. 18. The A.C. output of amplifier 19" is applied to terminal 34 and the D.C. output is available at terminal 35. The reference phase is derived from the A.C. power source supply sensors 10–13. The operation of phase sensitive rectifiers of this type is well understood in the art.

The comparison circuit 9 of FIG. 16 comprises a potentiometer 36, for setting the proper rotation velocity $V_{RO}$ into the system by establishing a direct voltage proportional to $V_{RO}$, a relay 37 and a diode 38. When the V output of sensor 13 is less than $V_{RO}$, relay 37 remains unenergized because of the direct bias voltage on diode 38. However, as V exceeds $V_{RO}$, diode 38 conducts on the positive half cycles and the resulting current in the coil of relay 37 actuates this relay which initiates action of the rotation programmer 17.

The programmer 17 comprises reversible D.C. motor 39 for driving the slider 40 of potentiometer 41. The alternating voltage across potentiometer 41 is previously set to a value corresponding to the proper lift-off attitude $\alpha_{LO}$ by means of potentiometer 42. During the time that V is less than $V_{RO}$ relay 37 is deenergized and power is applied through the normally closed contacts of this relay to the R (reverse) circuit of motor 39 causing slider 40 to be returned to its zero or ground end of potentiometer 41. At the ground end limit switch 43 is opened deenergizing the motor. When V exceeds $V_{RO}$ during the ground part of the take-off relay 37 is energized applying power to the F (forward) circuit of the motor through the normally open contacts of the relay and limit switch 44. The motor then drives slider 40 at a constant speed, determined by the setting of speed control rheostat 45, toward the high potential end of potentiometer 41. When this end is reached limit switch 44 opens de-energizing the motor. In this manner element 17 programs the rotation of the aircraft about its pitch axis from the horizontal to the proper lift-off angle $\alpha_{LO}$ over a time interval determined by the setting of speed control element 45.

The captive velocity element 22 of FIG. 16 comprises, as seen in FIG. 17, a servo system 45' for driving a threaded shaft 46 to thus move slider 47 along an A.C. potentiometer 48. During phase 1, the V output of sensor 13 is applied to the input of the servo system through contact $K_c$. Also, the voltage at slider 47 is fed back to the input of the servo system through contact $K_g$ for comparison with the output of sensor 13. If there is a difference the servo system operates to move slider 47 in such direction as to reduce the difference to zero. In this manner the potential at slider 47 always equals the output of sensor 13 when the servo system is in operation. At the end of phase 1, contacts $K_c$ and $K_g$ open, breaking the input and feedback circuits of the servo system and freezing the slider 47 at the position it had at the transition from phase 1 to phase 2. Therefore, during phase 2, the potential at slider 47 represents the velocity of the aircraft at the end of phase 1 and serves as the reference for holding the aircraft velocity constant at this value throughout phase 2, as already explained in connection with FIG. 16.

We claim:

The method of winged aircraft take-off from a runway, comprising: (1) applying thrust to the aircraft of sufficient magnitude to accelerate the aircraft to a velocity in excess of a predetermined lift-off velocity which in turn is a predetermined amount in excess of stall velocity for the aircraft; (2) as the aircraft approaches lift-off velocity on the runway, exercising pitch angle control to rotate the aircraft about its pitch axis to a predetermined lift-off angle-of-attack; (3) after lift-off, exercising pitch angle control to hold the angle-of-attack constant at its lift-off value until the acceleration of the aircraft has fallen to zero; (4) and then exercising pitch angle control to hold the aircraft velocity constant at the value it had when the acceleration became zero, for the remainder of the take-off.

References Cited by the Examiner

UNITED STATES PATENTS

| | | | |
|---|---|---|---|
| 1,703,488 | 2/1929 | Junkers | 244—63 |
| 2,145,459 | 1/1939 | Rhines | 244—63 |
| 2,734,702 | 2/1956 | Northrop | 244—63 |
| 3,040,568 | 6/1962 | Markusen | 73—178 |
| 3,052,122 | 9/1962 | Westerback | 73—178 |

FERGUS S. MIDDLETON, *Primary Examiner.*